US012483632B1

(12) United States Patent
Segal et al.

(10) Patent No.: US 12,483,632 B1
(45) Date of Patent: Nov. 25, 2025

(54) API DISCOVERY TECHNIQUES UTILIZING A MANAGED ROUTER SERVICE

(71) Applicant: Wiz, Inc., New York, NY (US)

(72) Inventors: Assaf Segal, Tel Aviv (IL); Shir Tamari, Tel Aviv (IL)

(73) Assignee: Wiz, Inc., New York, NY (US)

(*) Notice: Subject to any disclaimer, the term of this patent is extended or adjusted under 35 U.S.C. 154(b) by 0 days.

(21) Appl. No.: 19/222,577

(22) Filed: May 29, 2025

(51) Int. Cl.
*H04L 67/51* (2022.01)
*H04L 45/02* (2022.01)

(52) U.S. Cl.
CPC .............. *H04L 67/51* (2022.05); *H04L 45/02* (2013.01)

(58) Field of Classification Search
CPC ................................ H04L 67/51; H04L 45/02
USPC ......................................................... 709/203
See application file for complete search history.

(56) References Cited

U.S. PATENT DOCUMENTS

| 8,849,721 | B2 * | 9/2014 | Fedorov | ............... | G06Q 10/101 |
| | | | | | 709/205 |
| 10,200,389 | B2 | 2/2019 | Rostamabadi et al. | | |
| 11,683,333 | B1 | 6/2023 | Dominessy et al. | | |
| 2016/0091898 | A1 * | 3/2016 | Booher | ............... | G05D 1/0219 |
| | | | | | 701/26 |
| 2018/0025049 | A1 * | 1/2018 | Zeng | .................... | G06F 16/2308 |
| | | | | | 707/703 |
| 2021/0099483 | A1 | 4/2021 | Shukla | | |
| 2021/0377356 | A1 * | 12/2021 | Guim Bernat | .......... | H04L 67/56 |
| 2023/0009127 | A1 | 1/2023 | Boyer | | |
| 2025/0131007 | A1 * | 4/2025 | Vaknin | .................. | G06F 16/254 |

FOREIGN PATENT DOCUMENTS

WO     WO-2022022801 A1 *  2/2022  ............. H04L 45/02

* cited by examiner

*Primary Examiner* — Anthony Mejia
(74) *Attorney, Agent, or Firm* — M&B IP Analysts, LLC

(57) ABSTRACT

A method and system for API path discovery utilizing a managed API gateway is presented. The method includes detecting an API gateway, wherein the API gateway is a managed API router deployed externally to a cloud computing environment, providing an API routing service to at least a workload in the cloud computing environment; requesting a configuration object of the API gateway, wherein the configuration object includes at least a hint of an API path, wherein the API path is a logical path of a query; detecting a hint of an API path, in the configuration object wherein the hint indicates a potential API path in the cloud computing environment; generating an access instruction based on the potential API path; executing the access instruction in the cloud computing environment; and determining that the potential API path is a validated API path based on a response of executing a network access instruction.

19 Claims, 4 Drawing Sheets

API DISCOVERY TECHNIQUES UTILIZING A MANAGED ROUTER SERVICE

TECHNICAL FIELD

The present disclosure relates generally to the field of cybersecurity threat detection and specifically to the discovery of Application Programming Interface (API) paths which may indicate a potential cybersecurity threat, vulnerability, or data breach.

BACKGROUND

An API is a mechanism that enables two software components to communicate with each other using a set of definitions and protocols. There are multiple types of APIs, such as a Simple Object Access Protocol (SOAP) API, a Remote Procedure Call (RPC) API, a Websocket API, and a Representational State Transfer (REST) API.

API endpoints are final touchpoints in the API communication system. These include server Uniform Resource Locators (URLs), services, and other digital locations where the information is sent and received between systems. API endpoints are specific URLs where a client can access an API. API endpoints serve as an authorized entryway that enables applications to interact with services, retrieve data, and perform various functions.

Since these API endpoints expose sensitive information and allow access to critical systems, they are prone to cybersecurity attacks. Thus, API endpoint security is essential to protect sensitive data, prevent data leaks, prevent unauthorized network access, prevent data manipulation, and misuse.

Challenges in the field of endpoint security include the lack of visibility in detecting endpoints. Reasons for the lack of visibility in detecting endpoints are that endpoints are not static and change dynamically. Furthermore, the use of API gateways and proxies obstruct endpoint detection by acting as the front interface for network traffic. Further, API gateways route the network traffic to different backend services, hiding the actual API endpoints from external view.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include detecting an API gateway, where the API gateway is a managed API router deployed externally to a cloud computing environment, and providing an API routing service to at least a workload deployed in the cloud computing environment. The method may also include requesting a configuration object of the API gateway, where the configuration object includes at least a hint of an API path, where the API path is a logical path of a query. The method may furthermore include detecting a hint of an API path, in the configuration object where the hint indicates a potential API path in the cloud computing environment. The method may in addition include generating an access instruction based on the potential API path. The method may moreover include executing the access instruction in the cloud computing environment; and determining that the potential API path is a validated API path based on a response of executing a network access instruction. Other embodiments of this aspect include corresponding computer systems, apparatus, and computer programs recorded on one or more computer storage devices, each configured to perform the actions of the methods.

Implementations may include one or more of the following features. The method may include: inspecting a log for an indication of the API gateway. The method may include: detecting in a log of the cloud computing environment an event record corresponding to the potential API path; and determining that the potential API path is a valid API path based on the detected event record. The method may include: initiating verification of the valid API path. The method where verification further may include: generating a second access instruction based on the valid API path, where the second access instruction is executed over an external network to the cloud computing environment. The method may include: detecting a disk associated with the at least a workload in the cloud computing environment; and initiating inspection of the disk for a software application corresponding to a potential API path. The method may include: initiating static analysis on the software application to detect an API path corresponding to the potential API path. The method may include: detecting a plurality of hints, each hint of the plurality of hints corresponding to an unique potential API path. The method may include: detecting the hint of the API path in a resolver of a query language for an API. Implementations of the described techniques may include hardware, a method or process, or a computer-tangible medium.

In one general aspect, a non-transitory computer-readable medium may include one or more instructions that, when executed by one or more processing circuitries of a device, cause the device to: detect an API gateway, where the API gateway is a managed API router deployed externally to a cloud computing environment, and providing an API routing service to at least a workload deployed in the cloud computing environment; request a configuration object of the API gateway, where the configuration object includes at least a hint of an API path, where the API path is a logical path of a query; detect a hint of an API path, in the configuration object where the hint indicates a potential API path in the cloud computing environment; generate an access instruction based on the potential API path; execute the access instruction in the cloud computing environment; and determine that the potential API path is a validated API path based on a response of executing a network access instruction. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: detect an API gateway, where the API gateway is a managed API router deployed externally to a cloud computing environment, and providing an API routing service to at least a workload deployed in the cloud computing environment. The system may in addition request a configuration object of the API gateway, where the configuration object includes at least a hint of an API path, where the API path is a logical path of a query. The system may moreover detect a hint of an API path, in the configuration object where the hint indicates a potential API path in the cloud computing environment. The system may also generate an access instruction based on the potential API path. The system may furthermore execute the access instruction in the cloud computing environment. The system may in addition determine that the potential API path is a validated API path based on a response of executing a network access instruction. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: inspect a log for an indication of the API gateway. The system where the memory contains further instructions which when executed by the processing circuitry further configure the system to: detect in a log of the cloud computing environment an event record corresponding to the potential API path; and determine that the potential API path is a valid API path based on the detected event record. The system where the memory contains further instructions which when executed by the processing circuitry further configure the system to: initiate verification of the valid API path. The system where verification further may include: generating a second access instruction based on the valid API path, where the second access instruction is executed over an external network to the cloud computing environment. The system where the memory contains further instructions which when executed by the processing circuitry further configure the system to: detect a disk associated with the at least a workload in the cloud computing environment; and initiate inspection of the disk for a software application corresponding to a potential API path. The system where the memory contains further instructions which when executed by the processing circuitry further configure the system to: initiate static analysis on the software application to detect an API path corresponding to the potential API path. The system where the memory contains further instructions which when executed by the processing circuitry further configure the system to: detect a plurality of hints, each hint of the plurality of hints corresponding to an unique potential API path. The system where the memory contains further instructions which when executed by the processing circuitry further configure the system to: detect the hint of the API path in a resolver of a query language for an API. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
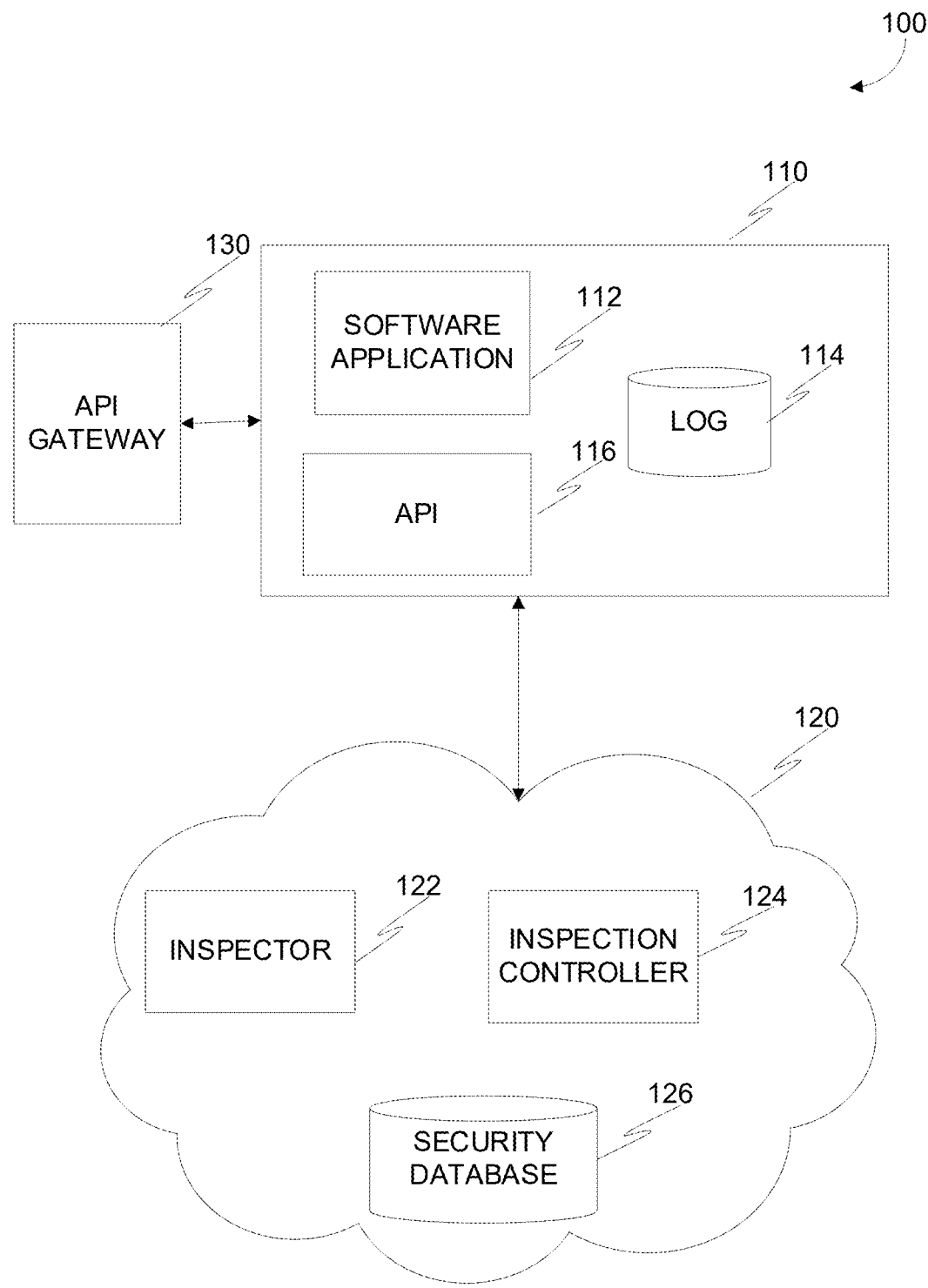
FIG. 1 is an example diagram of a cloud computing environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include API discovery techniques utilizing a managed router service. The disclosed embodiments provide API path discovery based on a managed router service, API gateway, and the like. Further, the disclosed embodiments provide API path discovery based on associating API hints to detect API paths. It is advantageous to utilize API hints to detect API paths because it provides for a more precise and accurate detection of API endpoints that may be potentially exposed. Further, it is advantageous to accurately detect API endpoints as they provide valuable insight for the detection and prevention of potential cybersecurity threats, vulnerabilities, data breaches, and the like.

FIG. 1 is an example schematic diagram 100 of a cloud computing environment, implemented in accordance with an embodiment. In an embodiment, the cloud computing environment includes a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like.

In an embodiment, the cloud computing environment includes a workload 110. In various embodiments, the workload 110 includes cloud entities deployed as components of the workload 110. In an embodiment, the cloud entity is a principal, a resource, a combination thereof, and the like. In an embodiment, the resource is a cloud entity that provides access to a compute resource, such as a processor, a memory, a storage, and the like. In some embodiments, the resource is a virtual machine, a software container, a serverless function, and the like. In an embodiment, the resource is a software application 112, such as a webserver, a gateway, a load balancer, a web application firewall (WAF), an appliance, and the like. In an embodiment, the workload 110 is, includes, etc., a virtual machine, a software container, serverless function, a combination thereof, and the like.

In certain embodiments, the software application 112, a log 114, an Application Programming Interface (API) 116, and the like, are components of the workload 110, of the computing system in which the software application 112 is deployed, etc. In some embodiments, an Application Programming Interface (API) gateway 130 is communicatively coupled to the workload 110. In an embodiment, the API gateway 130 is communicatively coupled to a component of the workload 110. In an embodiment, the API gateway 130 is communicatively coupled to the API 116. According to an embodiment, the API gateway 130 is a managed API gateway, a managed router, a combination thereof, and the like. In an embodiment, the API gateway 130 is deployed in a computing environment which is external to the computing environment in which the workload 110 is deployed. In an embodiment, the API gateway 130 is exposed as a software as a service (SaaS) to the workload 110.

In an embodiment, the API 116 is a software interface that enables software applications, software components, and the like, such as software application 112 to communicate with each other using a set of definitions and protocols. In various embodiments, the API 116 is configured to enable systems, software components, principals, cloud entities, resources, hardware components, and the like, to communicate with the software application 112. In some embodiments, the API 116 includes various types of APIs, including Simple Object Access Protocol (SOAP) APIs, Remote Procedure Calls (RPC) APIs, Websocket APIs, REST APIs, and the like.

In an embodiment, the API gateway 130 is configured to accept API call requests and route them to an intended service, resource, cloud entity, application, API, etc., in the cloud computing environment. For example, in an embodiment, the API gateway 130 is configured to route API call requests from a client (not shown) to the software application 112, for example via the API 116. In various embodiments, the API gateway 130 is configured to route responses from the service, the resource, the cloud entity, the application, and the like, back to the intended client.

For example, in an embodiment, the API gateway 130 is configured to route responses from the software application 112, the API 116, and the like, to the intended client. In some embodiments, the client includes a web application, service, public application, mobile application, and the like. In an embodiment, the API gateway 130 is deployed on an infrastructure external from the workload 110.

In an embodiment, an API call is a request from a client to retrieve data from the service, the resource, the cloud entity. In some embodiments, an API call is a request from a client for the service, the resource, the cloud entity, and the like, to perform a specific function. In some embodiments, an API call is an API request which includes a protocol such as a HyperText Transfer Protocol (HTTP) (e.g., GET, POST, PUT, PATCH, etc.), a Uniform Resource Locator (URL) endpoint, request parameters, a header, a combination thereof, and the like. In some embodiments, the API gateway 130 is configured to aggregate data from various service responses and return them back to the client.

In various embodiments, the API gateway 130 is configured to store a file. In some embodiments, the file is a configuration file, a code file, a library, a binary, a software file, a schema, a graph, and the like. In some embodiments, the file is configured to include objects, code objects, code, a combination thereof, and the like. In an embodiment, the file includes API paths, partial API paths, a hint of an API path, etc.

In an embodiment, the log 114 is configured to store a series of records, events, actions, and interactions that occur in the cloud computing environment. In some embodiments, the log 114 is configured to store events and interactions that occur between the API gateway 130, the API 116, the software application 112, a combination thereof, and the like. In various embodiments, the log 114 is configured to store API calls, API responses, API paths, API data, software application data, external Internet Protocol (IP) addresses, a combination thereof, and the like.

In various embodiments, the workload 110 is monitored by an inspection environment 120. In some embodiments, the inspection environment 120 includes an inspector 122, an inspection controller 124, a security database 126, a combination thereof, and the like.

In various embodiments, the inspector 122 is configured to access API calls, API responses, API paths, API data, API hints, the software application 112, the software application data, cloud infrastructure statuses, a combination thereof, and the like, from the log 114.

In some embodiments, the inspector 122 is configured to initiate static analysis on a configuration file, a code file, a code object, a software file, a schema, a graph, a combination thereof, and the like, to detect API paths, API hints, API software applications, code objects, software data, software files, and the like. In some embodiments, the inspector 122 is configured to initiate static analysis on the software application 112 including its code objects, code, and the like.

In an embodiment, an API hint is an extracted line of code, regex, etc., which indicates a potential API path. In an embodiment, the inspector 122 is configured to inspect an inspectable disk for a cybersecurity object. For example, in an embodiment, a cybersecurity object is a password, a certificate, a cryptographic key, a software, an application, a library, a binary, a configuration object, a filesystem, a combination thereof, and the like.

In certain embodiments, the inspection environment 120 further includes an inspection controller 124. In some embodiments, the inspection controller 124 is configured to assign specific inspection tasks to the inspector 122. In various embodiments, the inspection controller 124 is configured to define inspection policies, rules, conditional rules, and the like, for the inspector 122. In an embodiment, the inspection controller 124 is configured to determine which object, entity, resource, code object, software application, and the like, the inspector 122 should inspect.

In certain embodiments, the inspection controller 124 is configured to determine the order of which object, entity, resource, code object, software application 112, the inspector 122 should inspect. In an embodiment, the inspection controller 124 is configured to allocate an inspector 122, inspection resources, etc., for inspecting an inspectable disk. In some embodiments, the inspection controller 124 is configured to initiate generation of an inspectable disk. In some embodiments, for example where the API gateway 130 is a managed SaaS, a disk of a workload may not be accessible to the inspector 122. In such embodiments, the inspection controller 124 is configured to request access to the API gateway 130, receive a configuration object (e.g., a configuration file) from the API gateway 130, etc.

In various embodiments, a security database 126 is configured to store a representation of a cloud computing environment, for example, based on a unified data schema. In an embodiment, a unified data schema represents computing resources, entities, and the like, from a first cloud computing platform (e.g., AWS) and a second cloud computing platform (e.g., GCP) utilizing a single data schema.

In an embodiment, a representation of a resource, such as the workload 110, is stored in the security database 126. In an embodiment, the security database 126 includes a plurality of databases. In certain embodiments, the security database 126 is implemented as a graph database, tabular database, columnar database, a combination thereof, and the like.

In various embodiments, the security database 126 is configured to store representations of entities, objects, resources, systems, enrichment, insights, detections, findings, forensic artifacts, remediation actions, cybersecurity issues, cybersecurity threats, a combination thereof, and the like, of a cloud computing environment. In an embodiment, the representation includes a graph, a table, a visual depiction, numerical values, binary values, nodes, edges, a combination thereof, and the like.

In an embodiment, the security database 126 is configured to store a log of API calls, API responses, API 116 interactions with other entities, API interactions with the API gateway 130, and the like. In certain embodiments, the security database 126 is configured to store inspection results, inspection detections, and inspection data generated from the inspector's inspection of the workload 110. In an embodiment, the security database 126 is configured to store static analysis results from the inspector 122 conducting static analysis on an object, a code object, a configuration file, the software application, a software program, a source code, a code file, a combination thereof, and the like.

In an embodiment, the inspector 122 is configured to initiate static analysis on at least a file, a configuration object, a configuration file, etc., accessed from the API gateway 130 to detect API hints from code objects thereon. For example, in executable code an API hint may be "/users", "/checkbalance33", and the like. According to an embodiment, an inspection controller 124 is configured to generate potential API paths based on API hints detected in the configuration file.

Figure 2:
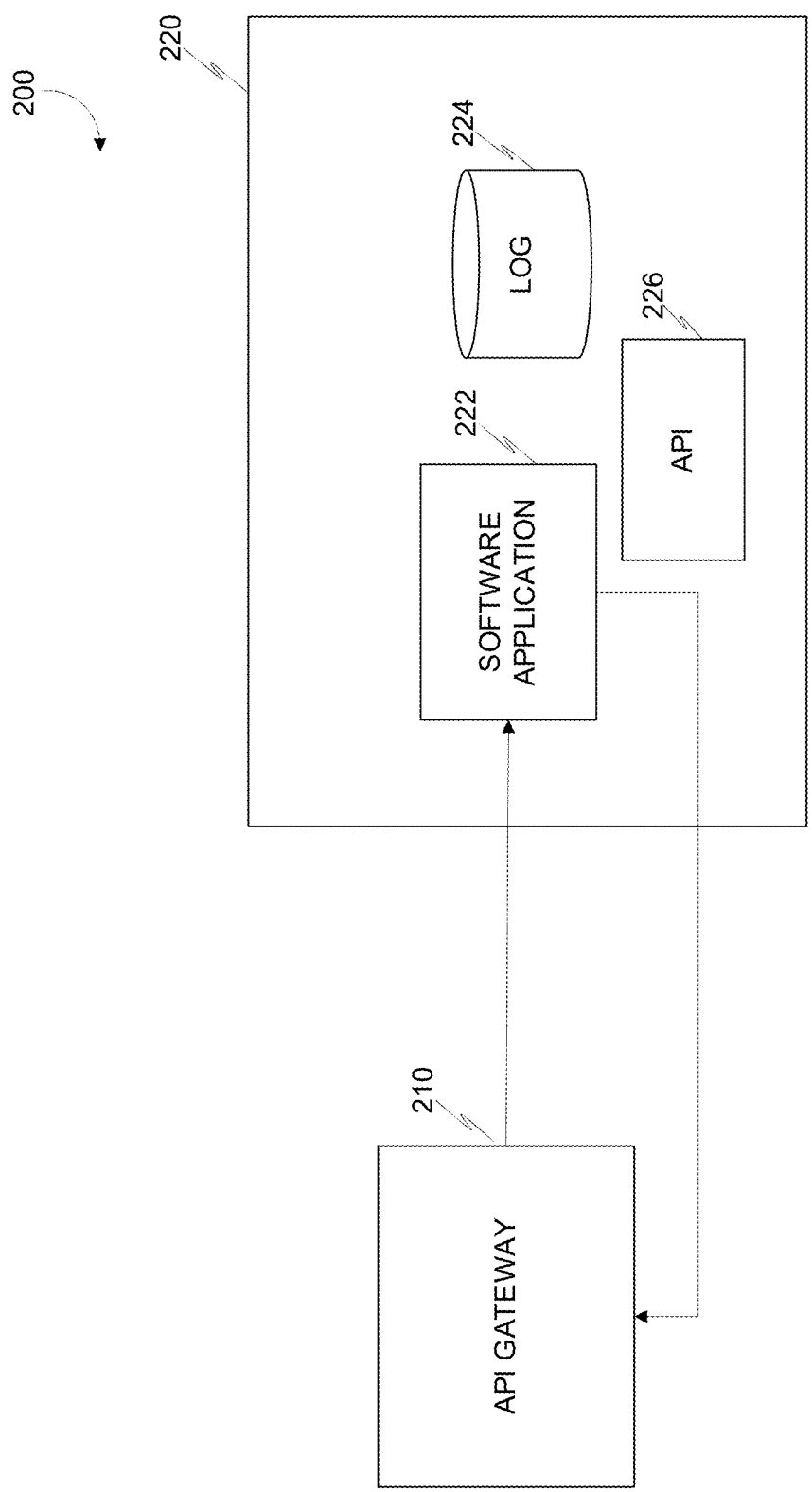
FIG. 2 is an example schematic diagram of a workload and an API gateway, implemented in accordance with an embodiment.

FIG. 2 is an example schematic diagram 200 of a workload and an API gateway, implemented in accordance with an embodiment.

In an embodiment, a software application 222, an API 226, and a log 224, are components of a workload 220. According to an embodiment, the workload 220 is implemented as a virtual machine, a software container, a serverless function, a combination thereof, and the like.

In an embodiment, the API 226 is a software interface that enables software applications, software components, and the like, to communicate with each other using a set of definitions and protocols. In various embodiments, the API 226 is configured to enable systems, software components, principals, cloud entities, resources, hardware components, and the like, to communicate with an application, a plurality of applications, etc., running on the workload 220.

In some embodiments, the software application 222 is executed on the workload. In an embodiment, when the software application 222 is executed by the workload 220, the software application 222 includes a process, a thread, etc., which is executed at runtime.

In various embodiments, an API gateway 210 is configured to manage interactions between clients, services, applications, software components, APIs, a combination thereof, and the like. In an embodiment, the API gateway 210 is configured to accept API incoming API calls and route them to the software application 222, the API 226, and any combination thereof. In various embodiments, the API gateway 130 is configured to route responses from the software application 222, the API 226, and the like, back to the intended client. In some embodiments, the client includes a web application, service, public application, mobile application, and the like. In an embodiment, the API gateway 210 is deployed externally from the workload 220.

In an embodiment, an API call is a request from a client to retrieve data from the service, the resource, the cloud entity. In some embodiments, the API call is a request from a client for the service, the resource, the cloud entity, and the like, to perform a specific function. In some embodiments, the API call is an API request which includes a protocol such as a HyperText Transfer Protocol (HTTP) (e.g., GET, POST, PUT, PATCH, etc.), a Uniform Resource Locator (URL) endpoint, request parameters, a header, a combination thereof, and the like.

In certain embodiments, the API gateway 210 is configured to aggregate multiple client requests into a single request. In an embodiment, the API gateway 210 is configured to forward the single client request to the intended service (e.g., software application 222). In some embodiments, the API gateway 130 is configured to aggregate responses, response data, from various services and return the aggregated response back to the client. In an embodiment, the API gateway 210 is configured to route API requests to various software applications, various workloads, etc. For example, in an embodiment, the API gateway 210 is configured to route a first API request to the API 226, and route a second API request to another API. In an embodiment, API requests are routed based on an API path included in the request.

In various embodiments, the API gateway 210 is configured to store a file, object, etc. In some embodiments, the file is a configuration file, a code file, a library, a binary, software file. In some embodiments, the file is configured to include objects, code objects, code, a combination thereof, and the like.

In certain embodiments, the configuration object, configuration file, code file, software files, and the like, include API paths, hints of API paths, API calls, API data, a combination thereof, and the like. In an embodiment, a hint of an API path indicates that an API path (or API endpoint) may be present, is a potential API path, etc. It is useful to generate potential API paths in order to discover a computing environment's true exposure, as each API path is a potential for a cybersecurity attack into the computing environment.

In an embodiment, the log 224 is configured to store events, interactions, communication, and the like, that occur between the API gateway 130, the API 226, the software application 222, a combination thereof, and the like. In various embodiments, the log 114 is configured to store API calls, API responses, API paths, API data, software application data, Internet Protocol (IP) addresses cloud infrastructure statuses, a combination thereof, and the like.

Figure 3:
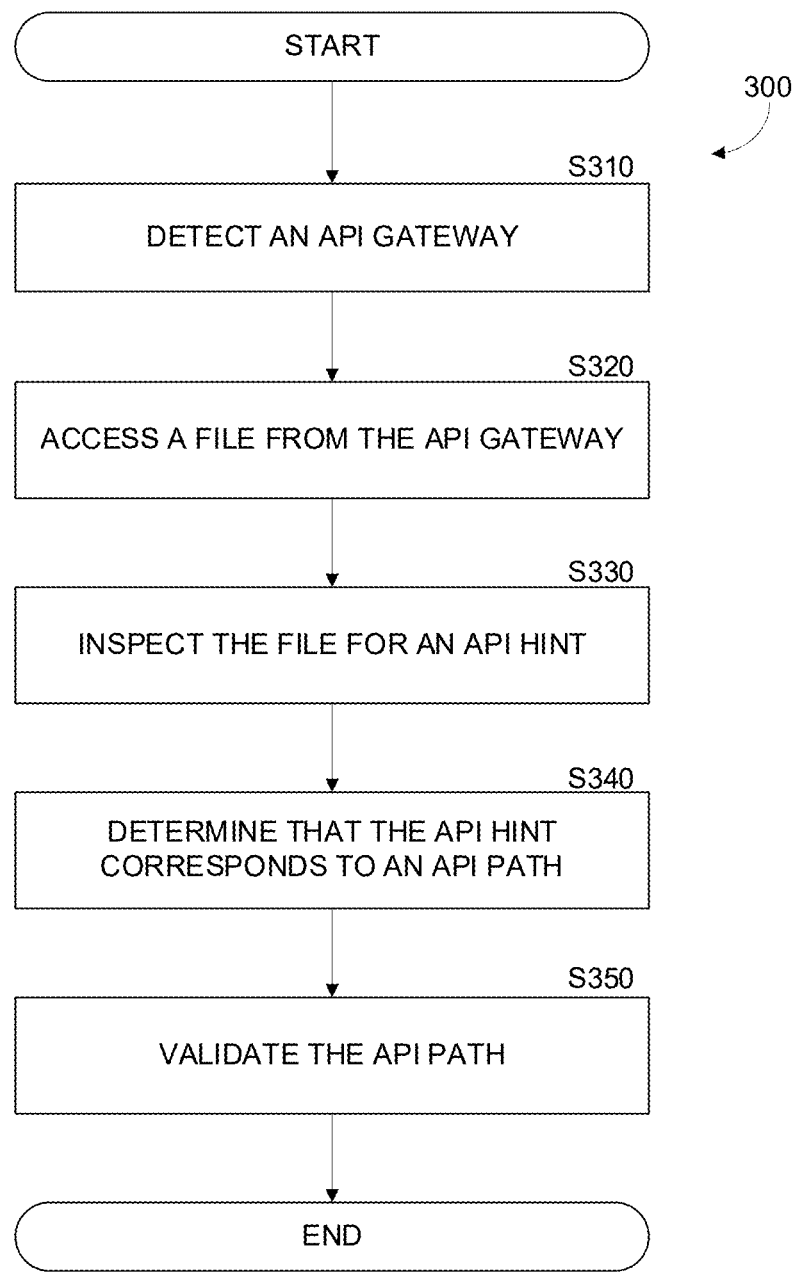
FIG. 3 is an example flowchart of a method for API path discovery utilizing a router, implemented in accordance with an embodiment.

FIG. 3 is an example flowchart 300 of a method for API path discovery utilizing a managed API router, implemented in accordance with an embodiment. It is advantageous, to utilize a managed API router to detect API hints for API path discovery as this provides for the efficient detection of exposed API paths that may indicate potential cybersecurity threats, vulnerabilities, exposures, and the like.

At S310, an API gateway is detected. In an embodiment, an API gateway includes a routing system, a router, and the like for routing API requests. In certain embodiments, an API gateway is an API router deployed externally from a workload, computing environment, and the like. In some embodiments, the API gateway is configured to accept API call requests and route them to an intended service, resource, cloud entity, application, and the like, in the cloud computing environment. For example, in an embodiment, the API gateway is configured to route API calls from a client to an application, an API, a combination thereof, and the like. In various embodiments, the API gateway is configured to route responses from the service, the resource, the cloud entity, the application, and the like, back to the respective client.

For example, in an embodiment, the API gateway is configured to route responses from a software application, and the like, back to the respective client. In some embodiments, the client includes a web application, a service, a public application, a mobile application, and the like. In an embodiment, the API gateway is deployed externally from a workload, a computing environment, a cloud computing environment, and the like. In certain embodiments, the API gateway is located on an external infrastructure from a workload, a computing environment, a cloud computing environment, and the like.

In some embodiments, the API gateway is configured to aggregate API call data, API data, API calls, API requests, a combination thereof, and the like, and route the aggregated message to the intended service. Further, the API gateway is configured to aggregate service responses, service response data, and the like, and return the aggregated response to its respective client.

In various embodiments, a log is configured to store a series of records, events, cloud logs, and interactions that occur between the API gateway, the client, the services, and the like. For example, in an embodiment, the log is configured to store a series of records, events, communications, interactions, and the like, between the API gateway, an API, a software application, a resource, and the like, of the cloud computing environment. In various embodiments, the log is configured to store API calls, API responses, API paths, API data, software application data, cloud infrastructure statuses, external Internet Protocol (IP) addresses, a combination thereof, and the like.

In an embodiment, the inspector is configured to inspect the log for an indication of an existing API gateway. In some embodiments, an inspector is configured to inspect the log in order to detect an API gateway that is external to the workload, inspection environment, and the like. In some embodiments, the inspector is configured to inspect the log for indications of an external API gateway. In various embodiments, the inspector is configured to inspect the log for external IP addresses, API paths, API calls, API responses, API data, and the like.

In an embodiment, external IP addresses, API paths, API calls, API responses, and the like, are detected from the log. In an embodiment, the detected external IP addresses, API paths, API calls, API responses, and the like, are analyzed to determine the existence of an external API gateway. In an embodiment, a detected external IP address is analyzed to determine an association with an existing API gateway. In an embodiment, a detected API path including its path prefixes are analyzed to determine any indication of an existing API gateway. In some embodiments, headers, or other portions of API calls, API responses, and the like, are analyzed to determine the indication of an API gateway.

At S320, a file is accessed from the API gateway. In various embodiments, the API gateway is configured to store a file, a plurality of files, and the like. In some embodiments, the file is a configuration file, a code file, a library, a binary, software file. In some embodiments, the file includes objects, code objects, code, a combination thereof, and the like. In certain embodiments, the file, configuration file, code file, code object, software files, and the like, include API paths, hints of API paths, API calls, API data, a combination thereof, and the like.

In various embodiments, an inspector, an inspector controller, a combination thereof, and the like, are configured to access at least a file from the API gateway. In some embodiments, objects, code objects, code, software programs, a combination thereof, and the like, include API paths, hints of API paths, API calls, API data, a combination thereof, and the like. In certain embodiments, objects, code objects, code, and the like, are extracted from the accessed file to detect API hints. In an embodiment, a hint corresponds to a unique potential API path.

In an embodiment, an API gateway is provided a request to receive a schema indicating an API path, a hint of an API path, etc. In some embodiments, the API gateway is configured to provide a subgraph, a representation of a microservice, a representation of a mesh of microservices, a combination thereof, and the like, which are utilized to determine an API structure provided by the API gateway. According to an embodiment, the API structure (i.e., configuration object) is utilized in lieu of a file, for example, in managed router service utilizing GraphQL®, such as Apollo®. In an embodiment, a resolver is a backend function, software logic, and the like, which is triggered when an API path, query, etc., is invoked. In some embodiments, the resolver is configured to retrieve, process, return, etc., an appropriate data value. For example, in a REST API this corresponds to route handlers, and in GraphQL it is a specific function mapped to a schema field.

At S330, the file is inspected for a hint of an API hint. In an embodiment, the inspector is configured to inspect the accessed configuration files, code files, libraries, binaries, software files, a combination thereof, and the like, for objects, code objects, code, a combination thereof, and the like. In an embodiment, objects, code objects, and the like, are detected in response to the inspection results of the inspector.

In some embodiments, a plurality of objects are detected. In an embodiment, detecting an object includes identifying a file, a folder, a filesystem, a registry record, a combination thereof, and the like.

In some embodiments, the inspector is configured to inspect a detected object of the file for a potential API path utilized by a cloud computing environment, workload, and the like. In an embodiment, an API path is a component or portion of a full API path, which is utilized as an API endpoint.

For example, in an embodiment, a hint of an API path is a version number, a name of the resource the API is interacting with, a resource identifier, query parameters, a combination thereof, and the like. In an embodiment, for example, a hint of an API path includes "v2/useraccount/12345/verification."

In some embodiments, the inspector is configured to detect a hint of an API path based on conducting static analysis on the detected objects, code objects, code, configuration files, code files, source files, and the like, which are stored on the API gateway. In an embodiment, the inspector is configured to perform static analysis by analyzing the object, code object, code, and the like, without executing the object as code. In an embodiment, static analysis includes parsing the objects in order to examine the objects and detect an API hint. In certain embodiments, static analysis utilizes pattern matching to detect API hints from objects based on using a predefined pattern for an API hint and comparing it to the detected object.

At S340, an API hint is determined to correspond to an API path. In various embodiments, the API hint is compared to a plurality of API calls, API responses, a combination thereof, and the like stored in the log, to determine if the API hint corresponds to an actual API path. For example, in an embodiment, an API hint of "v1/account/24/file" is compared to an event in the log which includes the API call "GET https://api.com/v1/account/24/file", and since the API hint matches a portion of the API call, the API hint does correspond to the API path.

In some embodiments, an API hint does not correspond to an API path in response to the API hint not matching a portion of any API call, stored in the log. For example, in an embodiment, an API hint of "v5/usersaccount/2100" does not match any API call stored in a log, thus, it is determined that the API hint does not correspond to any previously detected API path, e.g., an API path detected in a log.

However, not all API paths are actually called, and some API endpoints may be accessible, rarely accessed, etc., and thus do not appear in a log, for example, at a time of inspection. It is therefore advantageous to store a list, for example, of potential API paths which are generated based on an API hint and determine if a potential API is a valid API path.

In certain embodiments, where an API path is detected in a log based on an API hint, the API path may be verified, in order to determine if the API path is an API endpoint which is an exposed API endpoint. In an embodiment, an exposed API endpoint is a cybersecurity issue, as it is a point of exposure for a computing environment.

At S350, the API path is validated. In an embodiment, in response to the determination that an API hint corresponds to an API path, the API path is not validated, since it is detected, for example, in the log, but instead is verified. In some embodiments, an API path is generated based on a detected API hint, a protocol, a domain (e.g., from a base URL), a combination thereof, and the like. In various embodiments, a network access instruction is executed based on an API endpoint which in turn is generated based on the generated API path. In an embodiment, a potential API path is a validated API path based on a response of an executed network access instruction In certain embodiments, a network access instruction includes an HTTP protocol command, a header, an API path, query parameters, an API key, authentication details, payload requests, a combination thereof, and the like. For example, in an embodiment, a network access instruction includes an HTTP command such as "GET", "POST", "PUT", "DELETE", and the like. In an embodiment, for example, a network access instruction includes a header such as "Content-Type: application/json5", which indicates that the content of the request is an application in a JavaScript Object Notation (JSON) format.

In some embodiments, an API is configured to receive the network access instruction and generate a response to the network access instruction.

In an embodiment, the network access response is processed to determine whether the API path is valid. For example, in an embodiment, the network access response of "ERROR: access denied", indicates that the API path is valid, and it is verified to be unexposed. In an embodiment, for example, the network access response of "error not found", indicates that the API path is invalid.

According to an embodiment, an API path is generated based on an API hint. A potential API endpoint is generated based on the API path, and a network access instruction is generated for the API endpoint to determine if the API path is a valid API path. Where an API path is detected, for example in a cloud log, based on the API hint, validation is replaced with verification.

In some embodiments, verification is a process which includes determining if an API endpoint is exposed, for example, from an external network which is external to the computing environment in which the API endpoint is deployed. In some embodiments, verification includes executing a network access instruction over a network path which includes a public network, external network, a combination thereof, and the like.

In an embodiment, an API path may be valid, invalid, verified, validated, and unverified. A valid API path is one which is accessible, a verified API path is accessible from an external network, an invalid API path is not a functioning API path, and an unverified API path is an API path for which no determination has been made as to whether it is exposed or not.

Figure 4:
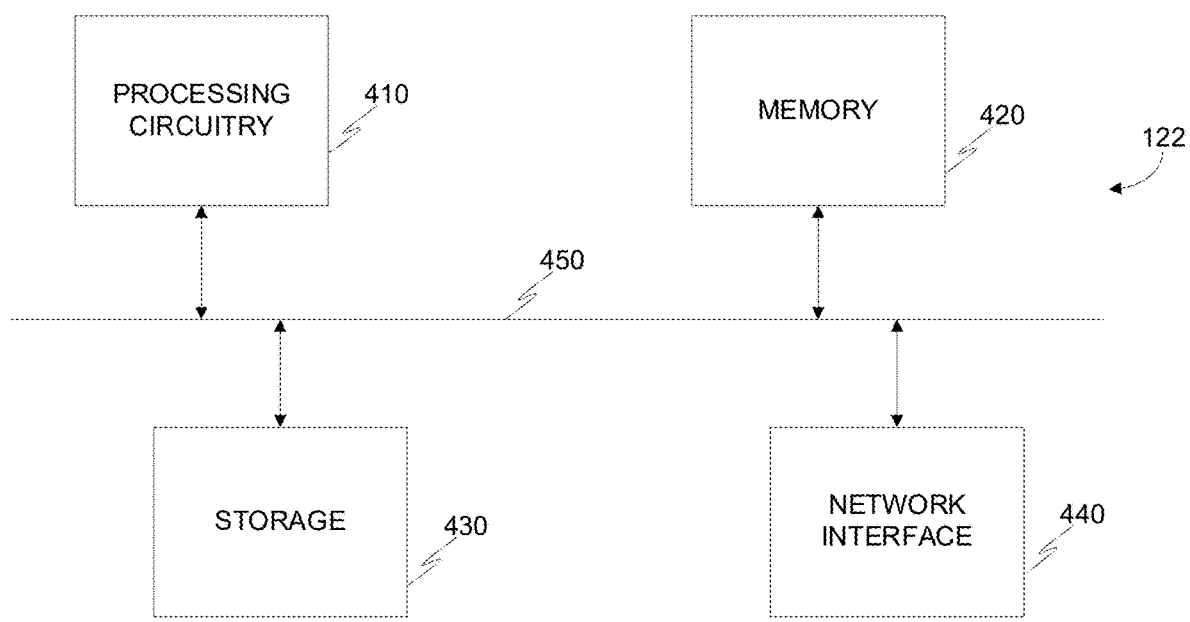
FIG. 4 is an example schematic diagram of an inspector, implemented in accordance with an embodiment.

FIG. 4 is an example schematic diagram of an inspector 122, according to an embodiment. The inspector includes a processing circuitry 410 coupled to a memory 420, a storage 430, and a network interface 440. In an embodiment, the components of the inspector 122 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the inspector 122 to communicate with, for example, an inspection controller 124, a security database 126, and the like.

It should be understood that the embodiments described herein are not limited to the specific architecture illustrated in FIG. 4, and other architectures may be equally used without departing from the scope of the disclosed embodiments.

Furthermore, in certain embodiments, the inspector 122, the inspection controller 124, and the like, may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for Application Programming Interface (API) path discovery utilizing a managed API gateway, comprising:
    detecting an API gateway, wherein the API gateway is a managed API router deployed externally to a cloud computing environment, and providing an API routing service to at least a workload deployed in the cloud computing environment;
    requesting a configuration object of the API gateway, wherein the configuration object includes at least a hint of an API path, wherein the API path is a logical path of a query;
    detecting a hint of an API path, in the configuration object wherein the hint indicates a potential API path in the cloud computing environment;
    generating an access instruction based on the potential API path;
    executing the access instruction in the cloud computing environment; and
    determining that the potential API path is a validated API path based on a response of executing a network access instruction.

2. The method of claim 1, further comprising:
    inspecting a log for an indication of the API gateway.

3. The method of claim 1, further comprising:
    detecting in a log of the cloud computing environment an event record corresponding to the potential API path; and
    determining that the potential API path is a valid API path based on the detected event record.

4. The method of claim 3, further comprising:
    initiating verification of the valid API path.

5. The method of claim 4, wherein verification further comprises:
    generating a second access instruction based on the valid API path, wherein the second access instruction is executed over an external network to the cloud computing environment.

6. The method of claim 1, further comprising:
    detecting a disk associated with the at least a workload in the cloud computing environment; and
    initiating inspection of the disk for a software application corresponding to a potential API path.

7. The method of claim 6, further comprising:
    initiating static analysis on the software application to detect an API path corresponding to the potential API path.

8. The method of claim 1, further comprising:
    detecting a plurality of hints, each hint of the plurality of hints corresponding to a unique potential API path.

9. The method of claim 1, further comprising:
    detecting the hint of the API path in a resolver of a query language for an API.

10. A non-transitory computer-readable medium storing a set of instructions for Application Programming Interface (API) path discovery utilizing a managed API gateway, the set of instructions comprising:
    one or more instructions that, when executed by one or more processing circuitries of a device, cause the device to:
        detect an API gateway, wherein the API gateway is a managed API router deployed externally to a cloud computing environment, and providing an API routing service to at least a workload deployed in the cloud computing environment;
        request a configuration object of the API gateway, wherein the configuration object includes at least a hint of an API path, wherein the API path is a logical path of a query;
        detect a hint of an API path, in the configuration object wherein the hint indicates a potential API path in the cloud computing environment;
        generate an access instruction based on the potential API path;

execute the access instruction in the cloud computing environment; and determine that the potential API path is a validated API path based on a response of executing a network access instruction.

11. A system for Application Programming Interface (API) path discovery utilizing a managed API gateway comprising:

a processing circuitry;

a memory, the memory containing instructions that, when executed by the processing circuitry, configure the system to:

detect an API gateway, wherein the API gateway is a managed API router deployed externally to a cloud computing environment, and providing an API routing service to at least a workload deployed in the cloud computing environment;

request a configuration object of the API gateway, wherein the configuration object includes at least a hint of an API path, wherein the API path is a logical path of a query;

detect a hint of an API path, in the configuration object wherein the hint indicates a potential API path in the cloud computing environment;

generate an access instruction based on the potential API path;

execute the access instruction in the cloud computing environment; and determine that the potential API path is a validated API path based on a response of executing a network access instruction.

12. The system of claim 11, wherein the memory contains further instructions which when executed by the processing circuitry further configure the system to:

inspect a log for an indication of the API gateway.

13. The system of claim 11, wherein the memory contains further instructions which when executed by the processing circuitry further configure the system to:

detect in a log of the cloud computing environment an event record corresponding to the potential API path; and determine that the potential API path is a valid API path based on the detected event record.

14. The system of claim 13, wherein the memory contains further instructions which when executed by the processing circuitry further configure the system to:

initiate verification of the valid API path.

15. The system of claim 14, wherein verification further comprises:

generating a second access instruction based on the valid API path, wherein the second access instruction is executed over an external network to the cloud computing environment.

16. The system of claim 11, wherein the memory contains further instructions which when executed by the processing circuitry further configure the system to:

detect a disk associated with the at least a workload in the cloud computing environment; and initiate inspection of the disk for a software application corresponding to a potential API path.

17. The system of claim 16, wherein the memory contains further instructions which when executed by the processing circuitry further configure the system to:

initiate static analysis on the software application to detect an API path corresponding to the potential API path.

18. The system of claim 11, wherein the memory contains further instructions which when executed by the processing circuitry further configure the system to:

detect a plurality of hints, each hint of the plurality of hints corresponding to a unique potential API path.

19. The system of claim 11, wherein the memory contains further instructions which when executed by the processing circuitry further configure the system to:

detect the hint of the API path in a resolver of a query language for an API.

* * * * *